3,413,115
BRAZING ALLOY

James E. Webb, Administrator of the National Aeronautics and Space Administration with respect to an invention of Donald Smith, Enfield, Conn.
No Drawing. Filed Jan. 20, 1966, Ser. No. 521,994
8 Claims. (Cl. 75—172)

The invention described herein was made in the performance of work under a NASA contract and is subject to the provisions of section 305 of the National Aeronautics and Space Act of 1958, Public Law 85-568 (72 Stat. 435; 42 U.S.C. 2457).

This invention relates to brazing alloys which are particularly applicable for brazing corrosion resistant steel (CRES) to refractory metals as well as for brazing refractory metals to other refractory metals.

The rapidly advancing technology in materials has produced a serious requirement for joining the materials by brazing. For instance, new materials such as refractory alloys are being developed, and known materials, such as refractory metals, are being used in new ways. Along with these new developments has come the requirement for joining these materials in such a manner as to avoid excess weight and to avoid known adverse results and effects. Very often mechanical fasteners and the like are not applicable or desirable because:

(1) they increase the weight of the final product,
(2) they will not withstand environmetal conditions, or
(3) they do not provide adequate leak-proof connections.

When conditions exist which precludes the use of fasteners it becomes necessary to produce a metal-to-metal bond such as a brazed joint, or connection. However, in the case of the aforementioned metals and alloys, the conditions applicable to the brazed region prevents the use of conventional known brazing alloys. For instance, conventional brazing alloys when used on the aforementioed materials produces: (a) brittle brazed regions, (b) the brazed region is subject to chemical reaction with materials contacting the bond, and (c) avoidance of leakage of fluids is not achieved. The brazed region should be ductile, not brittle, brazing time at elevated temperatures should be held to a minimum; the region brazed should be inert to nitric acid and capable of effectively sealing systems while in high vacuum for extended periods of time. Additionally, the brazing alloy is required to establish a metallurgical bond which will seal and join systems without the formation of undesirable phases at the braze interface. The established bond must have good strength and must not permit the leakage of gas as the leakage is so controlled so as not to exceed a prescribed amount.

For instance, assume a corrosion resistant steel pipe is to be brazed to a titanium pipe, and the bonded pipes are required to carry a fluid such as inert nitrogen, either in the gaseous or liquid state. Further, assume the bonded pipes are subject to severe vibration for a relatively extended period of time. The brazed region is required to be ductile so as to resist the vibrations, leakage of the fluid is required to be reduced to a minimum or a prescribed quantity, and the brazed region is required to be inert to the fluid carried in the pipes. Any results less than those defined and the brazed region is entirely unsatisfactory.

The brazing alloy of this invention achieves the foregoing benefits and avoids the adversities, and it does so when used to braze corrosion resistant steel to corrosion resistant steel, and corrosion resistant steel to refractory metals, and refractory metals to other refractory metals. The brazing alloy consists, broadly, of palladium, silver and silicon with impurities held to relatively minute quantities. With discrete adjustment of component quantities, brazing with the brazing alloy may occur at relatively low temperatures in a relatively short period of time and the established interface meets the aforementioned prescribed requirements.

Braze alloys exist which braze the combination of materials mentioned, but brazing occurs at excessively high temperatures and brazing time is excessively long resulting in producing a brittle unacceptable interface. The components of the known brazing alloys are such as to produce undesirable and unacceptable phases or compounds at the interface, the produced compounds being subject to chemical reaction. Further, it has been established excessive leakage occurs as the result of a brittle brazed region, or leakage occurs as the result of chemical reaction.

It has been determined the hereinafter specifically described brazing alloy is applicable for use to produce a brazed joint between corrosion resistant steel (CRES) and corrosion resistant steel (CRES), between corrosion resistant steel and titanium, between corrosion resistant steel and molybdenum, between corrosion resistant steel and columbium, and between corrosion resistant steel and zirconium. It is also applicable to produce a joint between titanium and molybdenum, and columbium and molybdenum. However, in order to achieve a maximum effective bond between the aforementioned materials, the capillary gap therebetween is required to be slightly greater than that required for other bonded materials and brazing alloys. For instance, the most effective gap for achieving an acceptable brazed region ranges between about 0.001–0.005 inch.

Additionally, when the brazing occurs below the beta transus temperature of titanium, when titanium is used, a minimum of chemical reaction between the bonded materials and the brazing alloys occurs to thereby provide a ductile bond or interface. The beta transus temperature for titanium is approximately 1650° F. To provide a temperature contrast, brazing of refractory materials with previously known brazing alloys has occurred at temperatures exceeding about 1800° F. with the result being: a chemical reaction between the brazing alloys and the brazed material occurs producing a brittle joint or juncture interface, among other adverse results. This elevated temperature in itself is not seriously objectionable, but what is objectionable is the temperature must be maintained too long when using the heretofore known brazing alloys. Much more reliable and satisfactory results are obtained when the temperature is lower, as hereinafter described, and when the dwell time at the brazing temperature is reduced to a minimum.

Brazing of the aforementioned refractory metals and steels with the brazing alloy of this invention may be accomplished best in vacuum or inert atmosphere. Also brazing may be accomplished with an oxyacetylene torch. When the brazing is accomplished in the manner just defined, a metallurgical bond is formed between titanium and corrosion resistant steel with there being a diffusion of the brazing alloy into titanium of between about 0.0005–0.001 inch and of the brazing alloy into the steel of between about 0.001–0.002 inch. This range of diffusion of the brazing alloy into the refractory materials also occurs between stainless steel and molybdenum, between stainless steel and columbium, between stainless steel and zirconium, between titanium and molybdenum, and between columbium and molybdenum.

Although it has been determined brazing is to occur at about 1450° F., it is to be noted the brazing temperature has little effect on the properties of the brazed joint so long as the temperature is above that at which the brazing alloy flow commences. Attention is directed to the condition wherein $Ti_5SiO_3$ forms at 1580° F. but is not formed below the temperature recited. What is important is to restrict the time at the elevated temperature to a minimum in order to minimize diffusion of the brazing alloy into the parent metal and reduce the possibility of intermetallic compound formation, particularly between silicon and titanium. When the time at elevated temperature is restricted to a minimum, a ductile brazed region is achieved.

The brazing alloy found to be effective for achieving the aforementioned benefits consist of the aforementioned three basic components. One of the components comprises palladium, and when combined with the other two is to be employed in quantities between about 80.3 to 83.0 percent by weight. Combined with palladium is silver, which is to be used in quantities between about 13.5 to 16.5 percent by weight, and the third component is silicon, which is to be used in quantities between about 3.3 to 3.7 percent by weight. Optimum quantities of the use of the components is 81.5 percent by weight palladium, 15.0 percent by weight of silver, and 3.5 percent by weight of silicon with the total impurities contained therein not to exceed 0.15 percent by weight. If silicon is used in quantities exceeding that just defined it has been determined a chemical reaction between the parent metal and silicon occurs which provides a brittle, unacceptable brazed region. Also, it has been determined silicon used in the quantities prescribed lowers the melting point of the brazing alloy and, therefore, contributes to obtaining a ductible interface brazed region having a minimum of the brazing alloy diffused into the parent material, and the chemical reaction between the brazing alloy and the parent material is restricted to a minimum. Beneficial properties of the brazing alloy in addition to those heretofore mentioned are the alloy has exceptional wetting properties which permit the establishment of a metallurgical bond with the parent structure.

Excellent brazing results have occurred when the materials were brazed in a vacuum of about $5 \times 10^{-5}$ torr, and as mentioned, use of an oxy-acetylene torch has produced results comparable to those achieved when brazing in a vacuum.

The following examples illustrate the versatility of the brazing alloy and also illustrate the quantities of components employed when brazing the various refractory metals together to produce a desirable and effective bond.

| Brazed Materials | Percent by weight of brazing alloy components | | |
|---|---|---|---|
| | Pd | Ag | Si |
| CRES-Titanium | 81.5 | 15.0 | 3.5 |
| | 80.5 | 15.9 | 3.6 |
| | 81.9 | 14.4 | 3.7 |
| | 81.3 | 15.2 | 3.5 |
| | 80.0 | 16.5 | 3.5 |
| | 80.2 | 16.5 | 3.3 |
| CRES-Molybdenum | 81.5 | 15.0 | 3.5 |
| | 83.0 | 13.5 | 3.5 |
| | 81.9 | 14.5 | 3.6 |
| | 81.6 | 14.9 | 3.5 |
| | 80.0 | 16.5 | 3.5 |
| | 80.2 | 16.5 | 3.3 |
| CRES-Columbium | 81.1 | 15.2 | 3.6 |
| | 82.4 | 14.0 | 3.6 |
| | 81.7 | 14.6 | 3.7 |
| | 81.9 | 14.5 | 3.6 |
| | 80.0 | 16.5 | 3.5 |
| | 80.2 | 16.5 | 3.3 |
| CRES-Zirconium | 82.1 | 14.3 | 3.6 |
| | 82.3 | 14.1 | 3.6 |
| | 81.9 | 14.8 | 3.3 |
| | 81.6 | 14.9 | 3.5 |
| | 80.0 | 16.5 | 3.5 |
| | 80.2 | 16.5 | 3.3 |
| Titanium-Molybdenum | 83.1 | 14.3 | 3.6 |
| | 81.0 | 15.5 | 3.5 |
| | 82.4 | 14.0 | 3.6 |
| | 81.3 | 15.1 | 3.6 |
| | 80.0 | 16.5 | 3.5 |
| | 80.2 | 16.5 | 3.3 |
| Columbium-Molybdenum | 81.1 | 15.3 | 3.6 |
| | 80.5 | 15.4 | 3.6 |
| | 81.6 | 14.8 | 3.3 |
| | 81.9 | 14.5 | 3.6 |
| | 80.0 | 16.5 | 3.5 |
| | 80.2 | 16.5 | 3.3 |

Although all the combinations of refractory materials heretofore identified are not included in the data, it is to be understood those materials may be brazed with the brazing alloy, and the percent by weight of the brazing alloy components will be within the ranges defined.

In order to achieve the foregoing results, the chemistry of the brazing alloy incorporates two significant items: (1) the alloy hardness is reduced by holding the silicon component to as low a level as possible, and (2) the liquidus and solidus temperatures of the brazing alloy are brought into closer proximity to approach the ternary eutectic which may exist.

By reducing the alloy hardness, it is possible to draw the alloy through wire discs allowing the use of wire, preforms, and the like, instead of powder.

By making the liquidus and solidus temperature to a near eutectic, heat sensitive components may be joined since the brazing alloy melts and flows quickly. Also the base metal solution is greatly reduced since the brazing alloy is molten for a shorter period of time.

While the present invention has been described herein in what is considered to be preferred embodiments thereof, it should be recognized that departures may be made therefrom within the scope of the invention, and it should therefore not be limited to the details of the within disclosure but should be accorded the full scope of the appended claims.

What is claimed is:

1. A brazing alloy which provides a ductile joint in the brazed region consisting of:
   (a) between about 80.0 to 83.0 percent by weight palladium;
   (b) between about 13.5 to 16.5 percent by weight silver; and,
   (c) the balance essentially silicon with amounts of impurities not to exceed 0.15 percent by weight.

2. A brazing alloy which provides a ductile joint in the brazed region consisting of:
   (a) between about 80.0 to 83.0 percent by weight palladium;
   (b) between about 3.3 to 3.7 percent by weight silicon; and
   (c) the balance essentially silver with amounts of impurities not to exceed 0.15 percent by weight.

3. A brazing alloy which provides a ductile joint in the brazed region consisting of:
   (a) between about 13.5 to 16.5 percent by weight silver;
   (b) between about 3.3 to 3.7 percent by weight silicon; and
   (c) the balance essentially palladium with amounts of impurities not to exceed 0.15 percent by weight.

4. A brazing alloy which provides a ductile joint in the brazed region consisting of:
   (a) between about 80.0 to 83.0 percent by weight palladium;
   (b) between about 13.5 to 16.5 percent by weight silver; and
   (c) between about 3.3 to 3.7 percent by weight silicon.

5. A brazing alloy according to claim 4 wherein the optimum amount of palladium used is about 81.5 percent by weight.

6. A brazing alloy according to claim 4 wherein the optimum amount of silver used is about 15.0 percent by weight.

7. A brazing alloy according to claim 4 wherein the optimum amount of silicon used is about 3.5 percent by weight.

8. A brazing alloy which provides a ductile joint in the brazed region consisting of:
   (a) about 81.5 percent by weight palladium;
   (b) about 15.0 percent by weight silver; and
   (c) about 3.5 percent by weight silicon with impurities not to exceed 0.15 percent by weight.

(References on following page)

References Cited

UNITED STATES PATENTS

| | | |
|---|---|---|
| 2,070,271 | 2/1937 | Gwyn. |
| 2,222,544 | 11/1940 | Spanner. |
| 2,270,594 | 1/1942 | Leuser. |
| 3,000,339 | 9/1961 | Coxe. |
| 3,070,875 | 1/1963 | Feduska. |

CHARLES N. LOVELL, *Primary Examiner.*